Aug. 31, 1965

W. SMITH ETAL 3,203,310

LIGHT COMPARATOR

Filed May 18, 1962

INVENTORS
William Smith, Alvin D. Cederbaum
BY
Ezekiel Wolf, Wolf & Greenfield
ATTORNEYS

United States Patent Office 3,203,310
Patented Aug. 31, 1965

3,203,310
LIGHT COMPARATOR
William Smith, 6715 Sausalito Ave., Canoga Park, Calif., and Alvin D. Cederbaum, 140 Lockwood Ave., New Rochelle, N.Y.
Filed May 18, 1962, Ser. No. 195,836
1 Claim. (Cl. 88—23)

This invention relates to an instrument for comparing the effects of artificial light and daylight upon various objects and more particularly comprises an improvement over the device disclosed in our Patent No. 2,827,562 issued March 18, 1958 entitled Illuminating Comparator.

The comparator disclosed in the earlier patent is capable of focusing simulated daylight and artificial light upon an object so that the appearance of the object under the different types of light may be visually observed. While the device adequately produces the different types of light under which objects are to be compared and enables the user quickly to change from one type of light to the other, the ultimate results obtained are dependent upon the judgment of the operator and the sensitivity of his visual apparatus. It is well know that the eyes undergo physical and physiological changes with age, and, therefore, the comparison made by a young person may produce wholly different results than a comparison made by an older individual.

The primary object of this invention is to provide a light comparator which eliminates to a large extent the use of human judgment in its operation.

Another important object of this invention is to provide a light comparator which provides scientific measuring instruments to implement the visual observations of its user.

Still another important object of this invention is to provide a light comparator having instruments which scientifically measure the light reflected from objects upon which light is directed and which enable the user to instantly change the character of the light from artificial to daylight.

Another important object of this invention is to provide a light comparator which is relatively inexpensive to manufacture but which yields highly accurate results.

To accomplish these and other objects the light comparator of this invention includes a housing in which are aligned in order, a light source, stop, filter and condenser lens for directing a focusable light beam upon an object to be examined. Means including a meter are mounted on the housing for measuring the light reflected from the object on which the beam is focused.

These and other objects and features of this invention will be better understood and appreciated from the following detailed description of one embodiment thereof, selected for purposes of illustration and shown in the accompanying drawing, in which.

Figure 1:
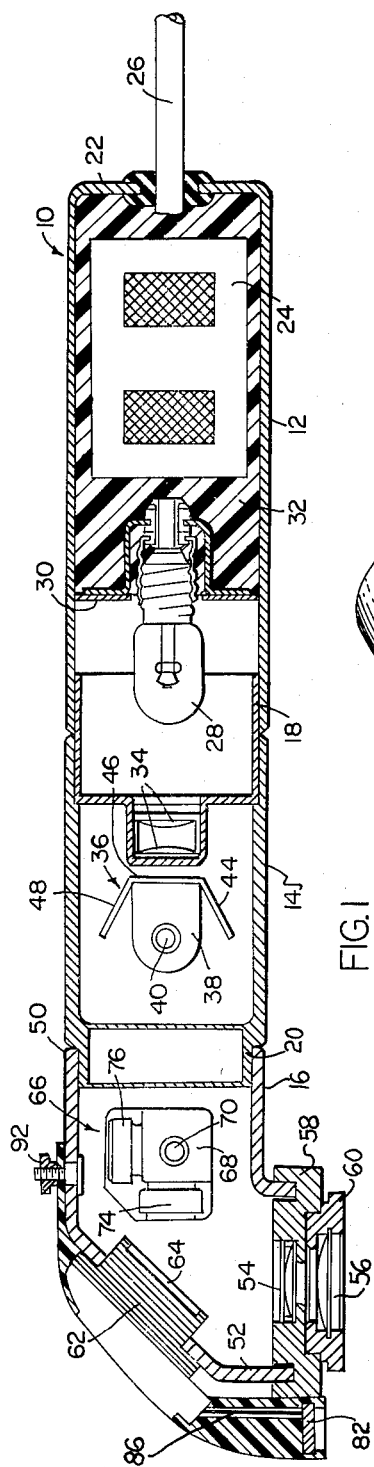
FIG. 1 is a plan view of a light comparator constructed in accordance with this invention.
Figure 4:
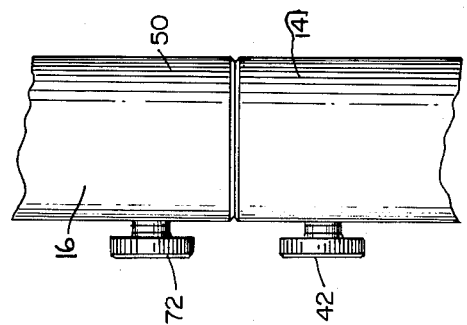
FIG. 4 is a fragmentary view of the comparator shown in FIG. 1.
Figure 3:
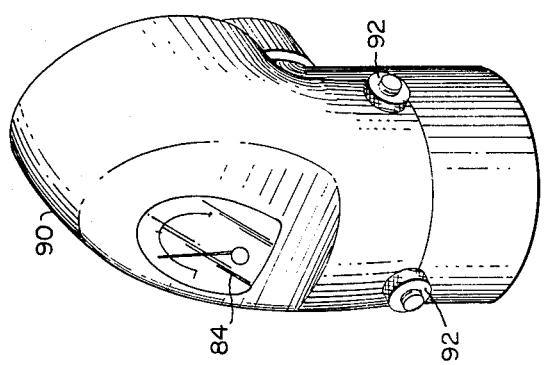
FIGS. 2 and 3 are perspective views of the front and back of one end of the comparator shown in FIG. 1.

The comparator shown in the drawing is essentially contained within a case 10 composed of three separable sections 12, 14 and 16 which are generally circular in cross section. Sections 12 and 14 are joined by a collar 18 which telescopically fits within the adjacent ends of those sections, while the other end of section 14 is provided with a shoulder 20 of reduced diameter to fit within the adjacent end of the other section 16.

Section 12 of the housing 10 is closed at its free end 22 and contains a small transformer 24 having a primary winding connected to the conductors of electric cord 26. The low voltage side of the transformer 24 is connected to a small lamp 28 carried by bracket 30 which extends across the housing section 12. The end wall 22 and the bracket 30 cooperate to define a chamber for the transformer 24 encased in potting compound 32.

Figure 2:
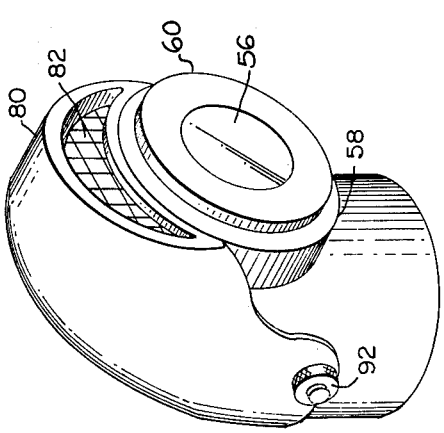

The end of the collar 18 disposed within the center section 14 of the housing supports a pair of planar convex lenses 34 for condensing the light rays emanating from the lamp 28 and directed to the stop assembly 36. The stop assembly 36 includes a pair of ears 38 (one of which is shown in FIG. 2) supported on a stud 40 which extends inwardly from the walls of the center section 14 of the housing. The stud 40 extends through one wall of the section 14 and carries an adjusting knob 42 on the outside of the housing and readily accessible to the operator. Three stop plates 44, 46 and 48 having openings (not shown) of different sizes are mounted on the ears 38 and may be selectively aligned with the light beam passing through the lenses 34 and emanating from the lamp 28, by turning the control knob 42.

The third housing section 16 turns in a 90° bend from one end to the other. Thus, the plane of the end 50 of the section 16 is disposed at 90° to the plane of the other end 52 which carries condensing lenses 54 and 56. The condensing lens 54 is shown to form part of a fixed lens assembly 58 on the end 52 of the housing section 16 while the lens 56 is part of a snap-on assembly 60 mounted in the aperture of the fixed assembly.

At the bend of the section 16 a cap 62 supports a mirror 64 which reflects the beam of light emanating from the lamp 28, along a path aligned with the axes of the condensing lenses 54 and 56. Ideally, the cap 62 is removable so that the mirror may be replaced or polished when required.

Within the section 16 adjacent its coupling with the center section 14 is a filter assembly 66 which includes a bracket 68 carried on a stud 70 on the wall of section 16. The stud 70 extends out one side of the section 16 and carries a control knob 72 similar to knob 42. The bracket 68 supports two filters 74 and 76, one of which is an artificial light filter and the other a filter which simulates daylight. The filter lenses may be selectively positioned in the path of the light beam emanating from the lamp 28 by means of the control knob 72. In the position shown, the filter lens 74 is in the path of the beam emanating from lamp 28 and by turning the knob 72 90° the other filter lens 76 will be positioned in the path of the beam.

The light comparator thus far described is substantially identical to that shown in our earlier patent. The features now to be described constitute the improvement upon the device shown in that patent. In FIG. 2 a photosensitive device 80 in the form of a photoelectric cell is shown detachably secured to the outside of the section 16 adjacent the lens assembly 58 through which the light beam from the lamp 28 is directed to an object to be tested. The plane of the face 82 of the photoelectric cell is normal to the axis of the condensing lenses 54 and 56 and is positioned to gather reflected light from an object upon which the beam of lamp 28 has been directed.

Also mounted on the section 16 and in the embodiment shown above the rear face of cap 62 is a light meter 84 secured to the photoelectric cell by conductors 86. The meter 84 is provided to measure the intensity of the light sensed by the photoelectric device 80 to indicate accurately to the user the effect of the light beam upon the object.

It will be noted in the drawing that the position of the meter 84 is such that it may be readily simultaneously viewed by the user as he views visually the effects of the light on the objects. Thus, the position of the meter as well as the readily accessible positions of the control knobs 42 and 72 enable an operator to use the light comparator easily and quickly without requiring that his attention be diverted to make any adjustments of the parts or a reading of the meter.

When light is projected through the daylight filter of the comparator to an object to be inspected, the reflected light is picked up by the photoelectric cell and conveyed in the form of a signal to the meter which indicates the value of the reflectance. The user may note the meter reading and then make a similar measurement with the artificial light filter positioned in the beam of light in place of the daylight filter. The comparative readings of the meter with each of the filters may be extremely valuable particularly when coupled with the visual observations made by the user. The accurate reading available at the meter can serve as a basis for making whatever corrections are necessary in color values etc. whenever the instrument is used.

For convenience, the photoelectric device 80 and the meter 84, along with the connecting conductors 86, are joined together in hood 90 removably retained on the housing section 16 by the screws and knurled nuts 92.

From the foregoing detailed description it will be appreciated that by the addition of the light measuring device, namely, the photosensitive device and the meter, the comparator becomes a highly valuable aid in many fields such as medicine, dentistry, industry, art, etc. and wherever color and varying shades, hues and tints are the objects of comparative evaluation and determination. The addition of the measuring instrument enables a most accurate comparative evaluation of the intensity of the reflected daylight and artificial light illumination. It assures that the same evaluation will be made by young and old people alike, and their own human failings will not detract from the accuracy and consistency of an evaluation.

Because numerous modifications of this invention will suggest themselves to one skilled in the art, it is not our intention to limit the breadth of this invention to the single embodiment illustrated and described. Rather, it is our intention that the breadth of this invention be determined by the appended claim and equivalent.

What is claimed is:

A light comparator comprising an elongated housing,
a light source, stop assembly, filter assembly, including a daylight and an artificial light filter and a condensing lens aligned in order in said housing,
an attachment section mounted on said elongated housing and containing a photocell, a meter for measuring light sensed by the photocell, and electrical connections extending from said meter to said photocell,
said photocell having a face lying in a plane substantially normal to an axis of said condensing lens,
said meter being mounted with a scale face thereof lying substantially outside said photocell face plane and in a position where a user can visually view said scale and a light beam from said source on an object in a single field of view,
said housing comprising a first elongated section having a first longitudinally extending axis and a second elongated section terminated by said condensing lens with said lens axis being substantially at a right angle to said first longitudinal axis,
said attachment section having the shape of a hood and overlying and conforming to the shape of a portion of said first elongated section and a portion of said second elongated section with means removably attaching said attachment section to said housing,
and said meter scale face being angularly offset with respect to the plane of said photocell face.

References Cited by the Examiner
UNITED STATES PATENTS

| | | | |
|---|---|---|---|
| 2,022,919 | 12/35 | Logan | 88—14 |
| 2,164,513 | 7/39 | Gaebel. | |
| 2,358,020 | 9/44 | Miller. | |
| 2,484,299 | 10/49 | Labrum. | |
| 2,827,562 | 3/58 | Smith et al. | |
| 2,838,683 | 6/58 | Munro. | |

JEWELL H. PEDERSEN, *Primary Examiner.*